(12) United States Patent
Maskrot et al.

(10) Patent No.: US 9,139,478 B2
(45) Date of Patent: Sep. 22, 2015

(54) METHOD FOR PREPARING A POWDER COMPRISING CARBON, SILICON AND BORON, THE SILICON BEING IN SILICON CARBIDE FORM AND THE BORON BEING IN BORON CARBIDE FORM AND/OR BORON ALONE

(75) Inventors: Hicham Maskrot, Antony (FR); Benoit Guizard, Créteil (FR); Francois Tenegal, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 26 days.

(21) Appl. No.: 13/318,067

(22) PCT Filed: Apr. 29, 2010

(86) PCT No.: PCT/EP2010/055829
§ 371 (c)(1),
(2), (4) Date: Mar. 9, 2012

(87) PCT Pub. No.: WO2010/125149
PCT Pub. Date: Nov. 4, 2010

(65) Prior Publication Data
US 2012/0152724 A1  Jun. 21, 2012

(30) Foreign Application Priority Data
Apr. 29, 2009 (FR) ...................................... 09 52842

(51) Int. Cl.
*B01J 19/12* (2006.01)
*C04B 35/622* (2006.01)
(Continued)

(52) U.S. Cl.
CPC ........... *C04B 35/6267* (2013.01); *B01J 19/121* (2013.01); *B82Y 30/00* (2013.01);
(Continued)

(58) Field of Classification Search
CPC .............. C04B 35/6267; C04B 35/563; C04B 2235/3834; C04B 2235/3821; C04B 2235/421; C04B 2235/3826; C04B 35/565; C04B 2235/5454; C04B 2235/5409; C01B 31/36
USPC ........................... 204/157.41, 157.45, 157.47
See application file for complete search history.

(56) References Cited

U.S. PATENT DOCUMENTS 3,334,967 A * 8/1967 Bourdeau ..................... 423/291
3,625,846 A * 12/1971 Murdoch et al. ......... 204/157.45
(Continued)

FOREIGN PATENT DOCUMENTS

JP    63-230514 A    9/1988
WO    88/08328 A1   11/1988

OTHER PUBLICATIONS

Tenegal et al, "Flame temperature effect on the structure of SiC nanoparticles grown by laser pyrolysis," J. of Nanoparticle Research 6:63-70, 2004.*
(Continued)

*Primary Examiner* — Keith Hendricks
*Assistant Examiner* — Colleen M Raphael
(74) *Attorney, Agent, or Firm* — Knobbe, Martens, Olson & Bear, LLP

(57) ABSTRACT

A method is followed to prepare a powder that includes carbon, silicon and boron, the silicon being in silicon carbide form and the boron being in boron carbide and/or free boron form. The method includes contacting a carbon-based precursor, a silicon-based precursor and a boron-based precursor BX3, X being a halogen atom, to obtain a mixture of these three precursors. The resulting mixture is subjected to laser pyrolysis. The boron-based precursor BX3 is heated, prior to the contacting step and/or simultaneously with the contacting step, to a temperature higher than the condensation temperature of the precursor.

11 Claims, 1 Drawing Sheet

(51) Int. Cl.
   C04B 35/56    (2006.01)
   C01B 31/36    (2006.01)
   C04B 35/626   (2006.01)
   B82Y 30/00    (2011.01)
   C04B 35/563   (2006.01)
   C04B 35/565   (2006.01)

(52) U.S. Cl.
   CPC .............. *C01B 31/36* (2013.01); *C04B 35/563* (2013.01); *C04B 35/565* (2013.01); *C04B 2235/3821* (2013.01); *C04B 2235/3826* (2013.01); *C04B 2235/3834* (2013.01); *C04B 2235/421* (2013.01); *C04B 2235/5409* (2013.01); *C04B 2235/5454* (2013.01)

(56) References Cited

U.S. PATENT DOCUMENTS

| | | | | |
|---|---|---|---|---|
| 4,162,301 | A | * | 7/1979 | Hamling ..................... 423/440 |
| 4,295,890 | A | | 10/1981 | Stroke |
| 4,556,416 | A | * | 12/1985 | Kamijo et al. ................ 423/290 |
| 4,689,129 | A | * | 8/1987 | Knudsen .................. 204/157.41 |
| 4,832,929 | A | * | 5/1989 | Saiki et al. .................... 423/346 |
| 4,847,060 | A | | 7/1989 | Saiki et al. |
| 4,895,628 | A | * | 1/1990 | Knudsen et al. ......... 204/157.41 |
| 4,957,884 | A | * | 9/1990 | Knudsen et al. ................ 501/87 |
| 7,101,520 | B2 | | 9/2006 | Kumar .................... 204/157.41 |
| 7,687,421 | B2 | * | 3/2010 | Dez et al. ..................... 501/96.2 |
| 8,128,861 | B1 | * | 3/2012 | Aghajanian et al. ......... 501/96.1 |
| 2005/0026769 | A1 | * | 2/2005 | Lee et al. .................... 501/96.2 |
| 2009/0020411 | A1 | * | 1/2009 | Holunga et al. ......... 204/157.41 |
| 2010/0209328 | A1 | * | 8/2010 | Bi et al. .................. 204/157.41 |
| 2012/0328467 | A1 | * | 12/2012 | Fernandez Acevedo et al. ............................ 420/83 |

OTHER PUBLICATIONS

Maskrot et al, "Blue TiO2-x/SiO2 nanoparticles by laser pyrolysis," J. of Nanoparticle Research (2006) 8: 351-360.*

Huisken et al, "Silicon carbide nanoparticles produced by CO2 laser pyrolysis of SiH4/C2H2 gas mixtures in a flow reactor," J. of Nanoparticle Research 1: 293-303, 1999.*

Makowska-Janusik et al, "Vibrational density of states in silicon carbide nanoparticles: experiments and numerical simulations," J. Phys. Condens. Matter 17 (2005) 5101-5110.*

Vapor pressure of boron trichloride, available online at http://encyclopedia.airliquide.com/images_encyclopedie/VaporPressureGraph/Boron_Trichloride_Vapor_Pressure.GIF.*

Machine translation of PCT/EP10/55829 ISR and Opinion.*

Seyferth, "Preceramic Polymers: Past, Present and Future," Office of Naval Research Technical Report No. 37, Nov. 2, 1992, p. 3, p. 18, 23 available online at http://www.dtic.mil/cgi-bin/GetTRDoc?Location=U2&doc=GetTRDoc.pdf&AD=ADA258327.*

A. Marra and J.S. Haggerty, "Synthesis and Characteristics of Ceramic Powders made from Laser-Heated Gases," Ceram. Eng. Sci. Proc. 1982, vol. 3, No. 31, pp. 3-19.*

French Search Report issued for the corresponding French Application No. 09 52842—3 pages.

Li et al., "Synthesis and microwave dielectric properties of Si/C/B powder", Transaction of Nonferrous Metals Society of China, vol. 16, 2006, pp. 470-473.

Guo et al., "Study of the sintering properties of plasma synthesized ultrafine SiC powders", Journal of Materials Science, vol. 32, 1997, pp. 5257-5269.

Forster J. et al., "Laserinduced Synthesis and Characterization of Boron Doped Nanosized Silicon Carbide Powders", Pro. 12th Int'l Symp. on Plasma Chemistry, 1995, pp. 1219-1224, XP002562005.

Vassen R. et al., "Densification of ultrafine SiC powders", Journal of Materials Science, vol. 31, 1996, pp. 3623-3637, XP002562006.

Forster J., "Laser chemical synthesis, characterisation and densification of ultrafine SiC and SiC/B powders", Database Inspec (Online) The institution of Electrical Engineers, Stevenage, GB; May 1995, XP002562007, Database accession No. 5217622.

International Search Report and Written Opinion issued for International Application No. PCT/EP2010/055829—12 pages.

* cited by examiner

METHOD FOR PREPARING A POWDER COMPRISING CARBON, SILICON AND BORON, THE SILICON BEING IN SILICON CARBIDE FORM AND THE BORON BEING IN BORON CARBIDE FORM AND/OR BORON ALONE

RELATED APPLICATIONS

This application is a U.S. National Phase of International Application No. PCT/EP2010/055829, filed Apr. 29, 2010, designating the U.S., and published in French as WO 2010/125149 on Nov. 4, 2010 which claims the benefit of French Patent Application No. 09 52842 filed Apr. 29, 2009.

TECHNICAL FIELD

The present invention relates to a method for preparing a powder comprising carbon, silicon and boron, the silicon being in silicon carbide form and the boron being in boron carbide and/or boron only form.

The said powders, since they comprise boron in particular, such as powders comprising at least 5% by weight of boron, are powders which are readily sintered and hence lend themselves to the design of parts consolidated from the said powders.

Therefore, the powders obtained with the method of the invention can find application in the design of parts obtained by sintering.

The powders obtained with the method of the invention can also be used for the design of self-healing matrixes, in particular when they have a boron content of more than 5% by weight. The self-healing phase of the said matrixes needs to have a contact surface with oxygen that is as high as possible. On account of the surface/volume ratio, the reactivity with respect to oxygen is thereby increased and boron carbide oxidizes to $B_2O_3$ form at lower temperatures and with faster kinetics.

BACKGROUND

Powders containing carbon, silicon and boron have been produced up until now using three types of techniques:
  the mechanical alloying technique;
  the technique using a solution route;
  the technique using a thermal route.

The mechanical alloying technique consists of mechanically grinding submicron-size powders of silicon carbide (SiC) and boron carbide ($B_4C$), in a device of crusher or ball mill type, for a sufficient time (often several hours) in an attempt to obtain a closely mixed powder having a silicon carbide phase and a boron carbide phase. However, no obtaining of powders of nanometric size has been reported using this technique. Moreover, the mechanical milling of powders may generate pollution of the resulting powders by elements originating from the milling device. As a result, the powders derived from this process cannot be used in applications requiring powders of high purity.

According to the solution technique, powders comprising carbon, silicon and boron are synthesized via sol-gel process using silicon-based precursors, carbon-based precursors and boron-based precursors. Such is the case in particular with the process described in Zhi-min et al. (Trans. Nonferrous Met. Soc. China, 16 (2006), 470-473), which respectively comprises:

a step to mix tetraethoxysilane, ethanol, sucrose and water;
a step to add tributyl borate to the resulting mixture, the pH being maintained until homogenization at a value of between 3 and 4;
a drying step in an oven at 60° C. to obtain a gel;
a carbothermal reducing step of the formed silica.

According to the technique via thermal route, the powders comprising carbon, silicon and boron can be prepared from gaseous precursors using different heat sources such as laser (in which case the term laser pyrolysis is used) or a plasma.

For example, Vassen et al. (Journal of Materials Science 31 (1996) 3623-3637), using laser pyrolysis, synthesized powders comprising carbon, silicon and boron from a mixture of precursors: $SiH_4$—$C_2H_4$—$B_2H_6$ with a boron content not exceeding 4% by weight. This synthesis mode, inter alia, has the disadvantage of using diborane $B_2H_6$, which is an unstable gas of high cost, and on this account difficult to use for producing powders having higher boron contents than the above-mentioned content.

Guo et al. (Journal of Materials Science, 32 (1997), 5257-5269) synthesized powders comprising carbon, silicon and boron through the use of a thermal plasma from a mixture comprising solid silicon, boron trichloride $BCl_3$ and methane $CH_4$. The powders obtained with this synthesis mode comprise less than 4% by weight of boron and finally do not give any boron carbide phase ($B_4C$) but boron nitride. The formation of boron nitride is generated by reaction of the nitrogen $N_2$ derived from the plasma on the transiently formed boron carbide as per the following reaction:

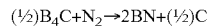

$$(\tfrac{1}{2})B_4C + N_2 \rightarrow 2BN + (\tfrac{1}{2})C$$

In addition, the powders obtained with this method are of submicron size.

Other authors have endeavored to synthesize powders comprising carbon, silicon and boron using thermal plasma, in particular using a radiofrequency plasma torch, such as Saiki et al. in U.S. Pat. No. 4,847,060 starting from a mixture of reagents such as a mixture of $SiCl_4$, $CH_4$ and $BCl_3$, and arriving at submicron powders having poor boron distribution in the particles of boron carbide and a boron content not exceeding 5% by weight.

On the basis of the drawbacks of prior art methods, the authors hereof have set themselves the objective of proposing a method for preparing powders comprising carbon, silicon and boron in the form of silicon carbide and boron carbide and/or boron alone, the said method being of simple implementation and low cost and which, by means of a reasoned combination of steps and reagents, allows powders to be obtained able to meet the following characteristics:
  nanometric size of the constituent particles of the powder;
  narrow size distribution;
  a boron content which may be high (for example possible reaching 30% by weight relative to the total weight of the other elements present in the powder);
  good dispersion of the silicon carbide and boron carbide phases;
  controlled composition of the powder, in particular regarding the ratios Si/B, Si/C and B/C.

SUMMARY

Therefore, the invention pertains to a method for preparing a powder comprising carbon, silicon and boron, the silicon being in the form of silicon carbide and the boron being in the form of boron carbide and/or boron alone, comprising the following steps:

a step for contacting a carbon-based precursor, a silicon-based precursor and a boron-based precursor $BX_3$, X being a halogen atom, so as to obtain a mixture of these three precursors;

a step to subject the resulting mixture to laser pyrolysis, the boron-based precursor $BX_3$ being heated, prior to the contacting step and/or simultaneously with the contacting step, to a temperature higher than the condensation temperature thereof.

This newly implemented method gives rise to the following advantages:

incorporation of the boron in the synthesized powders to the extent of the quantity of boron-based precursor used in the method, which allows the obtaining, if so desired, of high boron contents in the resulting powders;

the obtaining of a powder having a mean nanometric particle size and narrow size distribution.

Therefore, as mentioned above, the invention comprises a step to heat the boron-based precursor $BX_3$, X being a halogen atom, to a temperature higher than its condensation temperature before the contacting step and/or during the said contacting step, for example to a temperature ranging from 40 to 60° C. By proceeding in this manner, condensation of the precursor is prevented before it is subjected to pyrolysis, thereby preventing the obtaining of a quantity of precursor that cannot be incorporated into the powder on account of this condensation. By means of this step, the entirety of the boron derived from the precursor used to implement this method will be a constituent part of the powders. By adjusting the quantity of boron precursor used, it will therefore be possible directly to predict the quantity of boron which will be incorporated in the powder, and thereby to control the boron content thereof. This heating step, since it excludes the condensation of the boron-based precursor, also prevents damage to the equipment used to implement the method e.g. through clogging of the injection nozzles by the product resulting from condensation of the boron-based precursor.

The heating step may be conducted before the contacting step, for example before contacting the boron-based precursor with the other precursors (namely, the silicon-based precursor and the carbon-based precursor), this heating step possibly being conducted in an enclosure comprising the boron-based precursor (this enclosure possibly being a vessel for example having an outlet pressure of at least 0.4 bar) and/or in the injection duct of the said precursor intended to convey this precursor into the chamber where it will be contacted with the other precursors.

The heating step, in addition to avoiding condensation of $BX_3$, allows an increase in the flow rate of $BX_3$, in particular giving access to a flow rate sufficient to obtain large quantities of powder (for example a rate of 100 g/h).

The heating step may also be carried out during the contacting step, in which case the heating step will concern all the precursors contacted during this step.

It is not excluded, in the meaning of the invention, that the heating step may take place both before the contacting step and during the contacting step, so that there is no condensation of the boron-based precursor before the pyrolysis step.

The boron-based precursor may be boron trichloride $BCl_3$.

When the boron-based precursor is boron trichloride $BCl_3$, it may be heated prior to the contacting step and/or simultaneously with the contacting step to a temperature ranging from 40° C. to 50° C.

As mentioned above, the method of the invention comprises a contacting step, before laser pyrolysis, to contact a boron-based precursor $BX_3$, X being a halogen atom, a carbon-based precursor and a silicon-based precursor. Preferably the boron-based precursor is boron trichloride.

The carbon-based precursor may be a compound chosen from among the alkanes such as methane, the alkenes such as ethylene, and the alkynes such as acetylene.

Preferably, the carbon-based precursor may be a gaseous alkyne such as acetylene $C_2H_2$ which has the particularity of being highly reactive during the pyrolysis step, since it decomposes more rapidly than methane $CH_4$ and ethylene $C_2H_4$ and at lower temperature.

The silicon-based precursor is preferably a silane compound such as $SiH_4$.

Preferably, the boron-based precursor is $BCl_3$, the carbon-based precursor is acetylene $C_2H_2$ and the silicon-based precursor is $SiH_4$, this mixture of precursors being advantageous from a cost viewpoint and also having thermokinetic properties that are particularly well suited for the method of the invention, in particular with a view to obtaining homogeneous powders in terms of size and composition.

The carbon-based precursor, the silicon-based precursor and the boron-based precursor, as is conventional are contacted in a mixing chamber, which can be heated to a temperature higher than the condensation temperature of the boron-based precursor. The injection of the carbon-based precursor, of the silicon-based precursor and of the boron-based precursor is advantageously carried out separately in the chamber, so that there is no contact between the precursors before they are placed in contact inside the chamber. This also allows the avoiding of chemical reactions between the precursors before they are placed in the mixing chamber. For this purpose, the mixing chamber can be provided with three separate injection orifices. Preferably, the injection of the precursors into the chamber is conducted vertically, which in other words means that the precursors are injected into a vertical chamber into the upper part thereof and are then concentrated under the effect of gravity in the lower part of the chamber after they have been injected.

The precursors are injected at predetermined rates in relation to the characteristics of the desired powder (particularly in terms of boron content, carbon content and silicon content).

The resulting mixture is then subjected to a laser pyrolysis step.

Laser pyrolysis is based on the interaction between precursors in the gaseous state (in our case here, the carbon-based precursor, the boron-based precursor and the silicon-based precursor) and a laser, generally a $CO_2$ laser, the said interaction translating as resonance between the emission spectrum of the laser and the absorption spectrum of the precursors. Absorption corresponds to the excitation of the vibration levels of the precursor molecules, which absorb the energy of laser radiation. The energy of the excited precursor molecules is propagated from molecule to molecule, generating the dissociation thereof and thereby forming a super-saturated vapour, in which nucleation and growth take place of the constituent particles of the powder. A flame called an <<incandescent>> flame may then be observed. The formed particles undergo an annealing effect on leaving the flame, the effect of which is to stop the growth of the particles.

From a practical viewpoint, the mixture obtained during the above-mentioned mixing step, as is conventional, is injected via an injection nozzle into a laser pyrolysis chamber in which a laser beam is emitted. The pressure in the pyrolysis chamber may range from 100 mbar to 900 mbar.

The laser used may be a gas laser, in particular a carbon dioxide laser able to emit in the infrared (their main wavelength band being centred between 9.4 and 10.6 µm). The power of a said laser may reach as high as 20000 W, and may range for example from 200 to 700 W.

Each fraction of the mixture (namely the fraction of mixture passing in the laser beam) is subjected to a short residence time, for example from 1 to 10 ms and at a temperature possibly ranging from 1000° C. to over 2500° C.

This method leads to nanometric powders comprising carbon, silicon and boron, the silicon being in the form of silicon carbide, the boron being in the form of boron carbide and/or free boron, and the carbon in addition to its presence in the form of carbide(s) possibly also being in the form of free carbon. The powders obtained have a narrow size distribution and may have a boron content ranging from 1 to 30% by weight relative to the total weight of the other elements present in the powder.

The powder obtained advantageously consists of nanometric particles, themselves advantageously consisting of boron carbide $B_4C$ and silicon carbide SiC phases.

The powders obtained with this method can then be collected in a collector device.

These powders can be used to form sintered parts having advantageous mechanical properties on account of the nanometric nature of the powders, or to produce self-healing matrixes.

The method of the invention can be implemented in a device respectively comprising:
   an injection chamber, into which the precursors are injected, which chamber can be composed of a heated mixing chamber, an injection rod connected to the upper part of the chamber, two injection rods connected to the side part of the chamber which allow the separate injecting of the different precursors, an injection nozzle allowing the injection into a pyrolysis chamber;
   a pyrolysis chamber, in which a laser beam is emitted which will interact with the mixture of precursors to form the above-mentioned powder.

The invention will now be described with reference to the following examples given for illustration and which are non-limiting.

DETAILED DISCUSSION OF CERTAIN ILLUSTRATIVE EMBODIMENTS

Example

Figure 1:
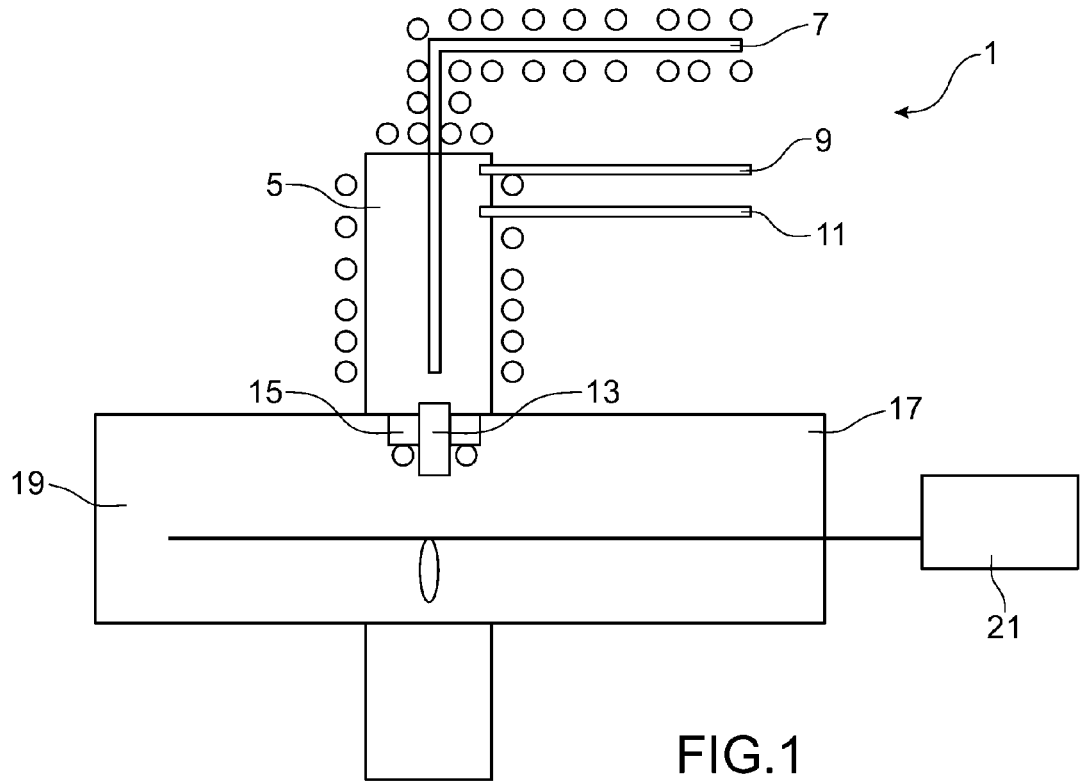
FIG. 1 gives a schematic illustration of a reactor capable of allowing the implementation of the method of the invention.

The present example illustrates the preparation of a powder comprising both a silicon carbide phase and a boron carbide phase by laser pyrolysis, conducted in a reactor 1 illustrated in FIG. 1 comprising the following elements:
   an injection chamber into which the precursors are injected then mixed before being subjected to laser pyrolysis, the said chamber is composed of a heated mixing chamber 5, an injection rod connected to the upper part of the chamber, two injection rods 9 connected to the side part of the chamber, an injection nozzle 13 allowing the injection of the mixture into a pyrolysis chamber; a confinement flue 15 arranged around the injection nozzle;
   a pyrolysis chamber 17 in which a laser beam 19 is emitted from a laser emitting device 21 which will interact with the mixture of precursors to form the above-mentioned powder.

The confinement flue firstly allows the produced powders to be contained within a laminar flow and secondly it prevents any contact with the metal walls of the reaction chamber and thereby avoids possible pollution.

The operating protocol is the following.

Into the mixing chamber, the injection is made of the following precursors:
   a silicon-based precursor: $SiH_4$;
   a carbon-based precursor: acetylene $C_2H_2$;
   a boron-based precursor: $BCl_3$ at the following respective flow rates: 3.6, 1.8 and 0.14 L/min, the flow rates being controlled by mass flow regulators,
   the said precursors are mixed in the said heated chamber to a temperature of 45° C.

In this example, the boron trichloride $BCl_3$ is injected into the chamber via the injection rod 7, whilst the acetylene and $SiH_4$ are injected into the chamber via the injection rods 9 and 11.

The boron-based precursor $BCl_3$ is previously heated before being injected into the reactor to 45° C. both before and during its passing in the injection rod.

The boron-based precursor $BCl_3$ is derived from a vessel in which it is contained, the vessel having an outlet pressure of at least 0.4 bar, this vessel being heated to 45° C. and agitated to accelerate the diffusion of heat therein and hence the transfer of the boron-based precursor $BCl_3$.

The mixture of precursors obtained in the mixing chamber is then injected via the injection nozzle into the pyrolysis chamber at a flow rate of 7.2 L·min$^{-1}$ in which it is subjected to an infrared (IR) laser beam, more precisely a $CO_2$ laser used at an operating power of 5000 W for a residence time of 2.8 ms.

The rate of production of the powder on leaving the pyrolysis chamber is of the order of 391 g/h.

The powder obtained was analyzed using the following techniques:
   X-ray diffraction, whose diffractogram is given in FIG. 2;
   observation of powder samples under transmission microscopy.

Figure 2:
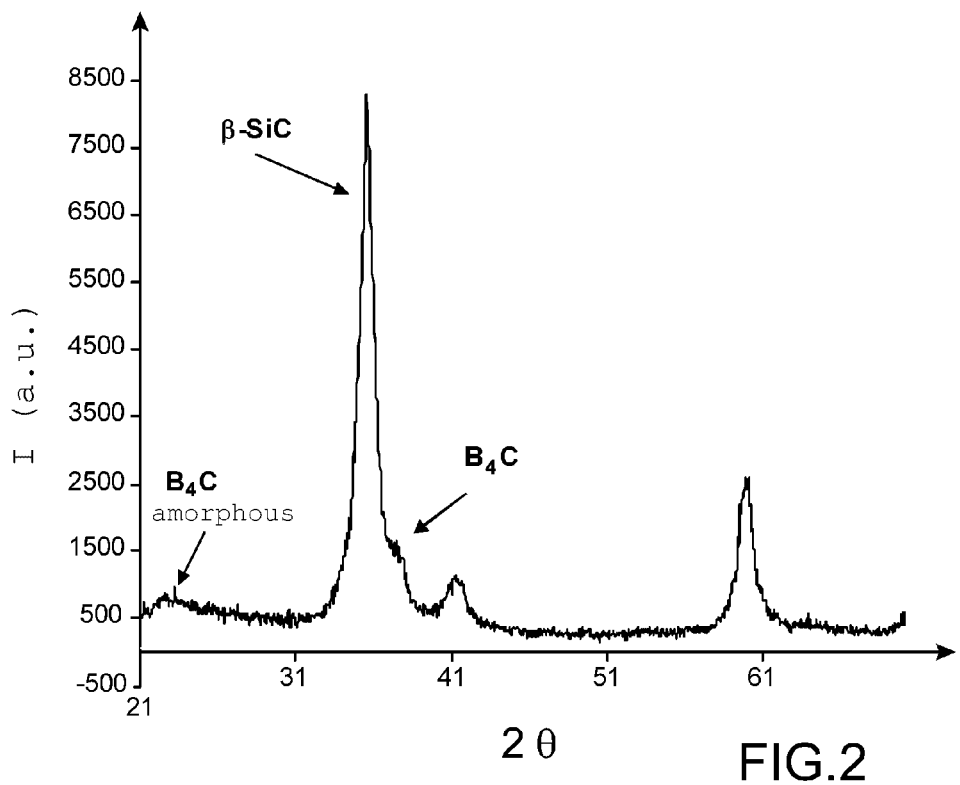
FIG. 2 is an X-ray diffractogram (the X-axis representing the angle 2θ and the Y-axis the intensity I (in arbitrary units a.u.) of the powder obtained according to the example described below.

In the X-ray diffractogram of a sample obtained in accordance with the above-defined protocol the presence of the following phases was observed:
   a silicon carbide phase β-sic, whose presence is indicated by an arrow in FIG. 2;
   a crystalline boron carbide phase and an amorphous boron carbide phase, whose presence is indicated by two separate arrows, the amorphous boron carbide phase being in the minority.

The width of the diffraction peaks in the diffractogram is an indication of the nanometric nature of the crystallites forming these powders.

The powder obtained was also the subject of elementary chemical analysis, to determine the weight percentage of each of the chemical elements present therein.

The values obtained with elementary chemical analysis are the following:
Boron: 27% by weight
Silicon: 36% by weight;
Carbon: 28% by weight;
Oxygen: 8% by weight
measurement error possibly being of the order of 2 to 3 weight % according to element.

The measurement was also made of the mean size of the constituent particles of the powder (namely the mean diameter thereof) using two methods:

- by transmission electron microscopy of the powder, which allowed the determination of a mean particle size of 25 nm, with narrow size distribution centred around this value;
- by measurement of specific surface area using the BET method, and by measurement of density using helium pycnometry which allowed the determination of a mean particle size of 22 nm.

Using the BET method, a BET specific surface area was also determined, of 102 m$^2$/g.

What is claimed is:

1. A method for preparing a powder comprising carbon, silicon and boron, the silicon being in silicon carbide form SiC and the boron being in boron carbide form B4C, comprising:
    providing:
        a carbon-based precursor selected from the group consisting of gaseous alkanes, alkenes and alkynes,
        a silicon-based precursor which is a gaseous silane compound, and
        a boron-based precursor $BX_3$, X being a halogen atom;
    contacting said carbon-based precursor, said silicon-based precursor and a said boron-based precursor, to obtain a mixture of these three precursors;
    prior to said contacting, heating said boron-based precursor $BX_3$ to a temperature higher than a condensation temperature of the boron-based precursor; and
    subjecting the resulting mixture to laser pyrolysis so as to obtain the powder comprising carbon, silicon and boron, the silicon being in silicon carbide form SiC and the boron being in boron carbide form $B_4C$;
    wherein the powder has a boron content ranging between 5% to 30% by weight relative to the total weight of the elements present in the powder.

2. The preparation method according to claim 1, wherein the boron-based precursor is boron trichloride $BCl_3$.

3. The method according to claim 1, wherein the carbon-based precursor is acetylene.

4. The method according to claim 1, wherein the silicon-based precursor is $SiH_4$.

5. The method according to claim 1, wherein the boron-based precursor is boron trichloride, the carbon-based precursor is acetylene and the silicon-based precursor is $SiH_4$.

6. The method according to claim 1 wherein, when the boron-based precursor is boron trichloride $BCl_3$, and wherein the boron-based precursor is heated prior to the contacting step and/or simultaneously with the contacting step to a temperature ranging from 40 to 50° C.

7. The method according to claim 1, wherein the contacting step is conducted in a chamber into which the carbon-based precursor, the silicon-based precursor and the boron-based precursor are separately injected.

8. The method according to claim 1, wherein the laser used in the laser pyrolysis step is a gas laser.

9. The method according to claim 8, wherein the gas laser is a carbon dioxide laser.

10. The method according to claim 1, wherein the powder is formed of nanometric particles.

11. The method according to claim 1, wherein the powder is composed of nanometric particles formed of $B_4C$ and SiC phases.

* * * * *